United States Patent [19]

Reed

[11] Patent Number: 4,588,204
[45] Date of Patent: May 13, 1986

[54] TRAILER HITCH CADDY

[76] Inventor: James R. Reed, 7121 E. Pleasant Run Pkwy. S. Dr., Indianapolis, Ind. 46219

[21] Appl. No.: 587,615

[22] Filed: Mar. 8, 1984

[51] Int. Cl.$^4$ .............................................. B60D 1/00
[52] U.S. Cl. .............................. 280/476 R; 254/8 R; 254/131; 280/46; 280/47.13 R; 280/47.3; 280/47.32; 414/447
[58] Field of Search ..................... 280/476 R, 477, 46, 280/43, 43.1, 47.11, 47.13 R, 47.13 B, 47.17, 47.18, 47.3, 47.32, 79.1 R, 79.1 A, 414.1, DIG. 2; 254/8 R, 131; 414/447, 467; 248/352

[56] References Cited

U.S. PATENT DOCUMENTS

| 3,237,960 | 3/1966 | Ziegler et al. | 280/84 |
| 3,439,764 | 4/1969 | Kimball | 280/46 X |
| 4,266,796 | 5/1981 | Riggs et al. | 280/767 X |

FOREIGN PATENT DOCUMENTS

| 1039142 | 5/1953 | France | 280/46 |
| 1081219 | 6/1954 | France | 280/46 |
| 704999 | 3/1954 | United Kingdom | 280/46 |

Primary Examiner—John J. Love
Assistant Examiner—Mitchell J. Hill
Attorney, Agent, or Firm—Woodard, Weikart, Emhardt & Naughton

[57] ABSTRACT

A caddy for pulling a trailer. A wheel is rotatably mounted to an axle which in turn is fixedly secured to an upright post into which a downwardly extending member on the trailer hitch is positionable. A handle is pivotally mounted to the axle and may be pulled to pull the trailer forwardly.

12 Claims, 2 Drawing Figures

TRAILER HITCH CADDY

BACKGROUND OF THE INVENTION

This invention is in the field of hand caddies for pulling trailers. A number of hand operated caddies have been provided for moving freight and wheeled vehicles. For example, a conventional dolly for moving boxes and similar materials is disclosed in U.S. Pat. No. 2,472,989 issued to Skipper et al. A similar device only having a ball hitch for moving a boat trailer is disclosed in U.S. Pat. No. 3,083,950 issued to Detwieler. Another hand truck with ball joint coupling is shown in U.S. Pat. No. 2,665,139 issued to Schroeder and U.S. Pat. No. 3,847,407 issued to Balleto. A tote-trailer with wheel locking device is shown in U.S. Pat. No. 4,188,164 issued to Hansen.

Despite the many prior hand operated trucks and dollies, there is still a need for a small lightweight dolly to be used to pull a trailer. Such a dolly is disclosed herein having only a single wheel mounted to an axle. The dolly structure is designed to allow continued support of the trailer above ground even though the dolly is unattended and has only a single ground contact area which is provided by the single wheel. The dolly handle and wheel are positioned on opposite sides of the dolly connection to the trailer hitch allowing the operator to easily change direction of movement by pivoting the handle about a vertical axis. The dolly disclosed herein is therefore distinguished from the prior trucks and dollies in that the trailer is supported above ground independent of movement of the dolly handle by a single wheel located off-center relative to the location of connection with the trailer thereby eliminating the misdirection problems occurring with conventional swivel wheels.

SUMMARY OF THE INVENTION

One embodiment of the present invention is a pull caddy for a trailer having a hitch with a downwardly extending support post comprising an axle with opposite ends and a horizontal axis extending longitudinally therethrough, a single wheel rotatably mounted to the axle and positioned at one of the ends remaining perpendicular to the axle at all times, an upright member mounted to the post between the ends and sized to fittingly hold above ground the post, and a handle mounted to the other of the opposite ends and pivotable about the axis independent of movement of the member.

A second embodiment of the present invention is the combination of a multi-wheeled trailer including a hitch adapted to be connected and pulled by a vehicle with the hitch having a downwardly extending support post to contact ground and support the hitch thereupon when at rest and not connected to a vehicle, an axle with opposite ends and a horizontal axis extending longitudinally therethrough, a single wheel rotatably mounted to the axle with the single wheel located between the hitch and ground and then remaining perpendicular to the axle at all times, an upright member mounted to the axle between the ends and sized to fittingly hold above ground the post, and a handle mounted to the axle and pivotable about the axis independent of movement of the member.

It is an object of the present invention to provide a single wheeled dolly to support a trailer hitch in an elevated position independent of the position of the pull handle.

A further object of the present invention is to provide an improved trailer dolly for engaging a trailer tongue jack to support and steer the trailer as desired.

Yet another object of the present invention is to provide a dolly having a single wheel for supporting a trailer hitch in an elevated position with the wheel being located off-center relative to the engaging area between the dolly and hitch.

Related objects and advantages of the present invention will be apparent from the following description.

DESCRIPTION OF THE PREFERRED EMBODIMENT

Figure 1:
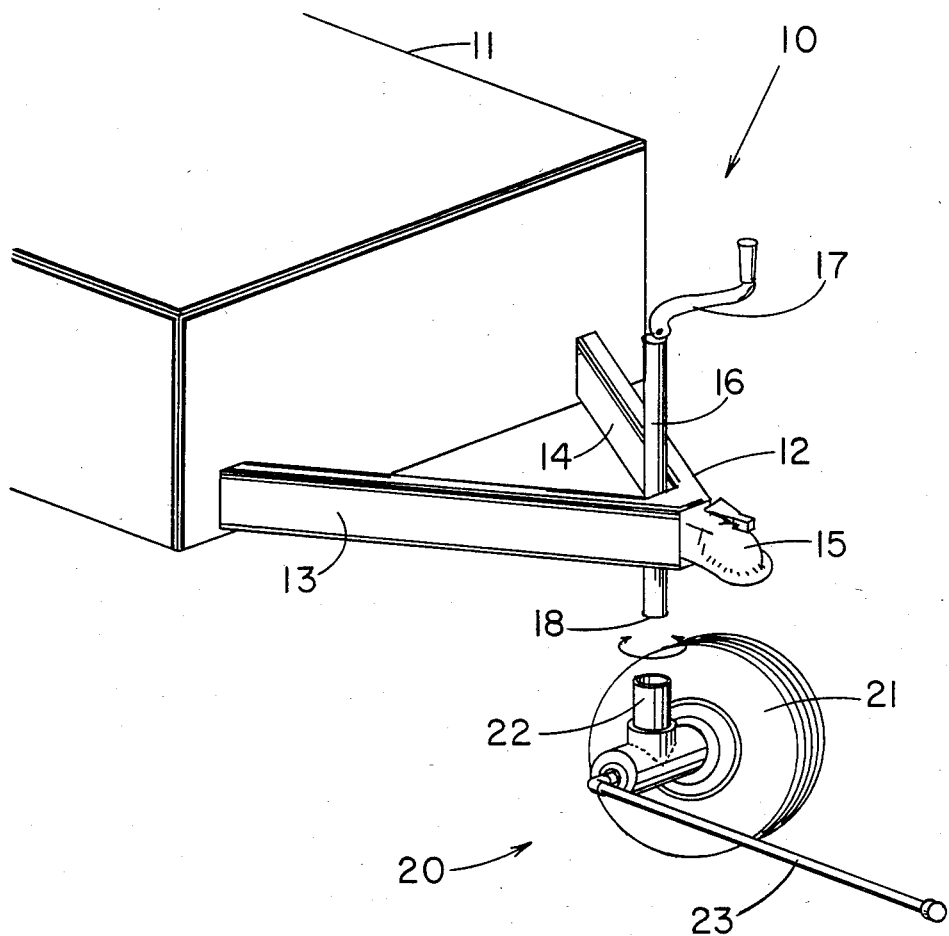
FIG. 1 is a perspective view of the dolly incorporating the present invention shown positioned adjacent a trailer hitch.
Figure 2:
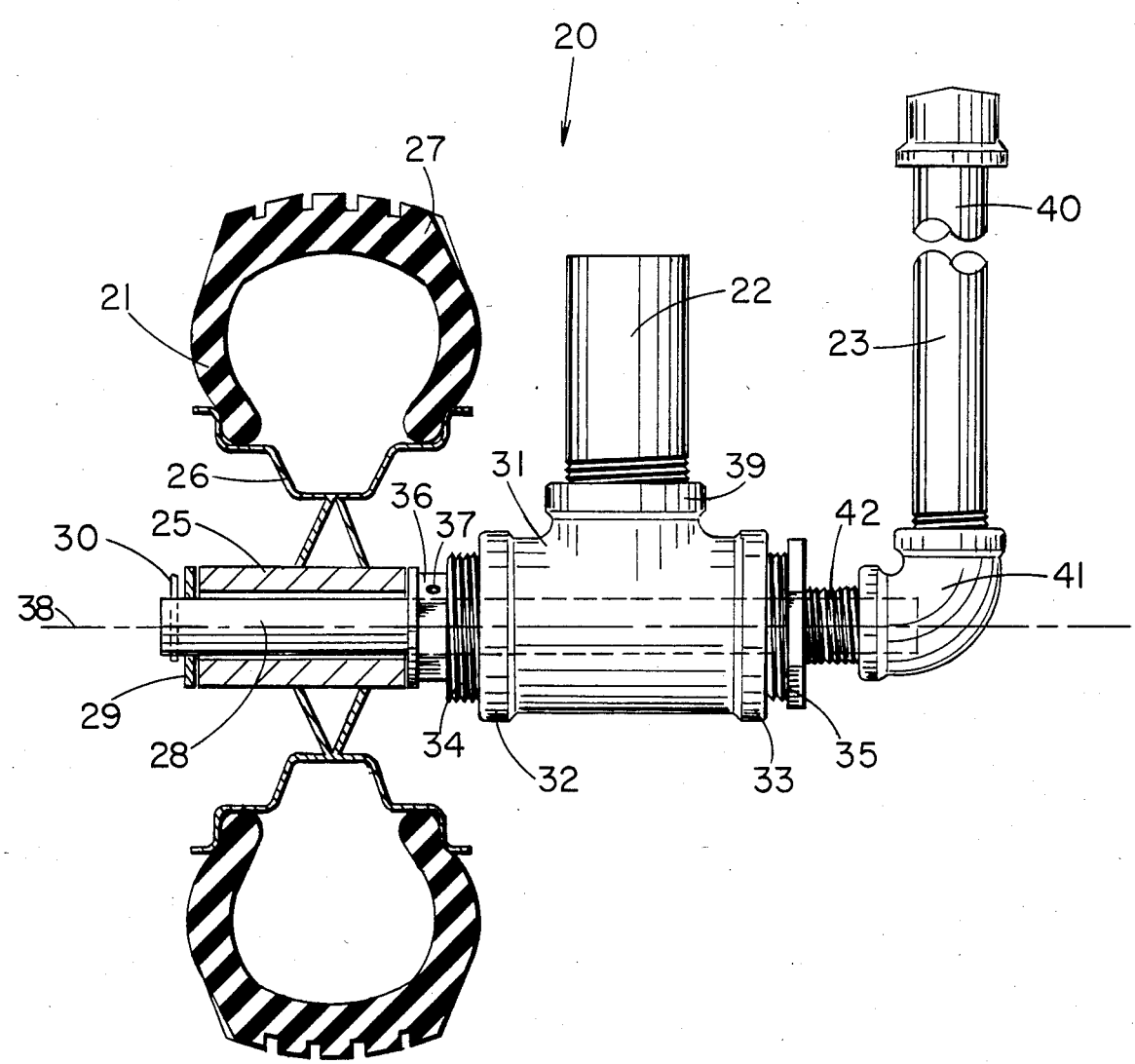
FIG. 2 is an enlarged cross-sectional view of the dolly shown in FIG. 1.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown a conventional trailer 10 having a main body 11 attached to a conventional trailer hitch 12. The hitch includes a pair of cantileveredly mounted beams 13 and 14 diverging together and connected to a ball socket receiving connector 15 which is operable to connect to a ball shaped male member mounted to a separate vehicle. Fixedly mounted to one or both of the outwardly extending beams 13 and 14 is a downwardly extending support post 16 having a crank handle 17 mounted thereon for moving the bottom end 18 in a vertical direction to allow either the bottom end to be retracted while the trailer is being pulled by a vehicle or to a downward position when the trailer is unattached and supported atop ground in a resting position. The construction of support posts 16 may take many forms; however, in one embodiment, handle 17 is connected to an internally threaded nut in turn in meshing engagement with an externally threaded vertically extending rod having as the bottom end thereof end 18. Thus, rotation of handle 17 causes bottom end 18 to move vertically.

Dolly 20 incorporating the present invention includes a conventional wheel 21 rotatably mounted to an axle having an upwardly extending member 22 mounted thereon. A handle 23 is connected to the dolly to enable the operator to pull the dolly and trailer forward once post 16 is inserted into member 22.

Wheel 21 is conventional in design having an axle hub 25 fixedly attached to a radially extending member 26 having on the outer periphery thereof a conventional tire 27 mounted thereto. Hub 25 is hollow and is rotatably mounted on axle 28 with the outer end of the axle extending outwardly of hub 25 through flat washer 29. A fastening device such as a cotter pin 30 extends through the outer end of the axle retaining the wheel thereon. A tubular body 31 has a pair of internally threaded opposite ends 32 and 33 receiving respectively externally threaded members 34 and 35. Member 34 has a hexagonally shaped outer surface 36 formed thereon with a set screw 37 extending therethrough frictionally engaging axle 28 and preventing relative movement between member 34 and the axle. Likewise, member 34 is tightly threaded to end 32 preventing relative motion between member 34 and main body 31. Member 35 is tightly threaded into end 33 preventing relative motion between member 35 and main body 31. The axle has a horizontally extending axis 38 extending longitudinally through the axle, wheel and main body 31.

An internally threaded boss 39 is integrally connected to main body 31 and threadedly receives an upstanding and hollow externally threaded post 22 into which support post 16 extends. Screw 37 along with member 34 and main body 31 provide a fastening means for mounting post 22 to axle 28 maintaining the perpendicularity therebetween and preventing relative motion between post 22 and the axle. Likewise, hub 25 has an internal diameter only slightly greater than the outside diameter of the axle thereby preventing the wheel from wobbling and maintaining the perpendicularity between the axle and wheel. Post 22 and axle 28 act together as a unit allowing the axle to remain parallel to the ground when post 16 is inserted into post 22. The axle remains parallel to the ground independent of the movement of handle 23 since the handle is pivotable about axis 38. Handle 23 consists of an outwardly extending rod 40 fixedly secured to a right angle fitting 41 having an externally threaded end 42 threadedly received into member 35. End 42 is loosely secured to member 35 allowing the handle to be pivoted about the horizontal axis and dropped to the ground even though post 22, member 31 and axle 28 remain motionless. The axle extends into coupling 41 but does not contact the interior surfaces thereof. Likewise, the handle and wheel may be pivoted about a vertical axis as shown by the arrows in FIG. 1 in order to steer the trailer. The distal end of handle 23 may be provided with an eye-bolt to facilitate attaching the handle to a tractor or other small vehicle.

A particular advantage of the caddy disclosed herein is the ability to position the bottom end 18 of the post into the upstanding member 22 without the necessity of lifting the hitch upwardly. By merely rotating handle 17 of the trailer hitch and positioning the bottom end 18 in the most upward position, member 22 may then be slipped beneath bottom end 18. The subject caddy is particularly advantageous since when the trailer is maneuvered for setting up or parking, the trailer becomes very difficult or impossible to lift and move the trailer simultaneously. The trailer dolly solves the problem by engaging the trailer tongue jack and thereby supporting and steering the trailer as desired. The capacity of the dolly may be increased by simply replacing the cold rolled axle with an alloy steel such as ASE 4130 heat treated.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A pull caddy for a trailer having a hitch with a downwardly extending support post comprising:
   an axle with opposite ends and a horizontal axis extending longitudinally therethrough;
   a single wheel rotatably mounted to said axle about said horizontal axis and positioned at one, and only one, of said ends remaining perpendicular to said axle at all times;
   an upright member mounted to said post between said ends and sized to fittingly hold above ground said downwardly extending support post; and,
   a handle mounted to the other of said opposite ends and having a pivot axis the same as said horizontal axis and being independent of movement of said member.

2. The caddy of claim 1 and further comprising fastening means mounting said member fixedly to said axle limiting relative motion therebetween, said fastening means mounting said axle and member together as a unit allowing said axle to remain parallel to the ground independent of handle movement about said axis when said member is engaged with said post.

3. The caddy of claim 2 wherein said handle is pivotally mounted to said fastening means and may be swung downwardly to rest atop ground when said member is engaged with said post and also upwardly to a pulling position.

4. The caddy of claim 3 wherein said fastening means includes a tubular main body through which said axle extends, said fastening means further includes a lock screw frictionally engaging said axle designed and arranged to maintain perpendicularity between said axle and said member and a threaded hole into which said member is mounted.

5. The caddy of claim 4 wherein said member is a threaded post into which said support post is positionable.

6. A pull caddy for a trailer having a hitch with a downwardly extending support post comprising:
   an axle with opposite ends and a horizontal axis extending longitudinally therethrough;
   a single wheel rotatably mounted to said axle and positioned at one of said ends remaining perpendicular to said axle at all times;
   an upright member mounted to said post between said ends and sized to fittingly hold above ground said post;
   a handle mounted to the other of said opposite ends and pivotable about said axis independent of movement of said member;
   further comprising fastening means mounting said member fixedly to said axle limiting relative motion therebetween, said fastening means mounting said axle and member together as a unit allowing said axle to remain parallel to the ground independent of handle movement about said axis when said member is engaged with said post;
   wherein said handle is pivotally mounted to said fastening means and may be swung downwardly to rest atop ground when said member is engaged with said post and also upwardly to a pulling position;
   wherein said fastening means includes a tubular main body through which said axle extends, a lock screw mounted to said main body and frictionally engaging said axle and a threaded hole into which said member is mounted;

wherein said member is a pipe into which said post is positionable; and, wherein said handle is threadedly mounted loosely to said tubular main body.

7. The combination of:

a multi-wheeled trailer including a hitch adapted to be connected and pulled by a vehicle with said hitch having a downwardly extending support post to contact ground and support said hitch thereupon when at rest and not connected to a vehicle;

an axle with opposite ends and a horizontal axis extending longitudinally therethrough;

a single wheel rotatably mounted about said horizontal axis to one, and only one, of said opposite ends of said axle with said single wheel located between said hitch and ground and then remaining perpendicular to said axle at all times;

an upright member mounted to said axle between said ends and sized to fittingly hold above ground said post; and, a handle mounted to the other end of said axle and having a pivot axis the same as said horizontal axis and being independent of movement of said member.

8. The combination of claim 7 and further comprising fastening means mounting said member fixedly to said axle limiting relative motion therebetween, said fastening means mounting said axle and member together as a unit allowing said axle to remain parallel to the ground and independent of handle movement about said axis when said member is engaged with said post.

9. The combination of claim 8 wherein said handle is pivotally mounted to said fastening means and may be swung downwardly to rest atop ground when said member is engaged with said post and also upwardly to a pulling position.

10. The combination of claim 9 wherein said fastening means includes a tubular main body through which said axle extends, said fastening means further includes a lock screw frictionally engaging said axle.

11. The combination of claim 10 wherein said member is a threaded post into which said support post is positionable.

12. The combination of:

a multi-wheeled trailer including a hitch adapted to be connected and pulled by a vehicle with said hitch having a downwardly extending support post to contact ground and support said hitch thereupon when at rest and not connected to a vehicle;

an axle with opposite ends and a horizontal axis extending longitudinally therethrough;

a single wheel rotatably mounted to said axle with said single wheel located between said hitch and ground and then remaining perpendicular to said axle at all times;

an upright member mounted to said axle between said ends and sized to fittingly hold above ground said post;

a handle mounted to said axle and pivotable about said axis independent of movement of said member;

fastening means mounting said member fixedly to said axle limiting relative motion therebetween, said fastening means mounting said axle and member together as a unit allowing said axle to remain parallel to the ground and independent of handle movement about said axis when said member is engaged with said post; and, wherein said handle is pivotally mounted to said fastening means and may be swung downwardly to rest atop ground when said member is engaged with said post and also upwardly to a pulling position;

said fastening means includes a tubular main body through which said axle extends, said fastening means further includes a lock screw frictionally engaging said axle;

said member is a threaded post into which said support post is positionable; and, said handle is threadedly mounted loosely to said tubular main body.

* * * * *